United States Patent [19]

Wittmann

[11] Patent Number: 5,175,804
[45] Date of Patent: Dec. 29, 1992

[54] SYSTEM AND METHOD FOR COLOR IMAGE REPRODUCTION FROM COLOR SEPARATIONS PREPARED FROM RANDOM FIXED SIZE DOT PLACEMENT

[75] Inventor: Dean K. Wittmann, West Jordan, Utah

[73] Assignee: Onyx Graphics Corporation, Salt Lake City, Utah

[21] Appl. No.: 531,521

[22] Filed: May 31, 1990

[51] Int. Cl.⁵ .......................................... G06K 15/00
[52] U.S. Cl. .................................. 395/108; 358/454; 395/109
[58] Field of Search ............... 395/101, 108, 109, 117, 395/131; 355/32; 358/429, 430, 80, 30, 75, 298, 454; 346/154, 157

[56] References Cited

U.S. PATENT DOCUMENTS

| | | | |
|---|---|---|---|
| 4,149,464 | 4/1979 | Rapoport et al. | 101/450 |
| 4,623,972 | 11/1986 | Darby et al. | 364/526 |
| 4,811,239 | 3/1989 | Tsao | 358/429 |
| 4,852,485 | 8/1989 | Brunner | 101/211 |

OTHER PUBLICATIONS

Helene Eckstein, "Four-Color Fundamentals: Your guide to spot color, process color, and the ABC's of CMYK", *Publish!*, May 1989, pp. 44-49.

Keith Baumann et al., "The Full-Color Desktop: Publish tests the latest Mac and PC color correction and separation tools, and comes up with some surprising results", *Publish!*, May 1989, pp. 50-59.

Keith Baumann, "Do-It-Yourself Color Separations: Pre-Press Technologies puts a full-color prepares lab on your desktop", *Publish!*, May 1989, pp. 60-63.

Donald E. Knuth, "Digital Halftones by Dot Diffusion", *ACM Transactions on Graphics*, vol. 6, No. 4, Oct. 1987, pp. 245-273.

*Primary Examiner*—Arthur G. Evans
*Attorney, Agent, or Firm*—Workman Nydegger and Jensen

[57] ABSTRACT

A system and method for color image reproduction prepared from random fixed size dot placement. In one embodiment, a color image is digitized using a scanner or other input device to prepare a red, green, blue (RGB) data file which is input to a central processing unit (CPU). The RGB data file is converted to corresponding standard process color files of cyan, magenta, yellow and black (CMYK). The CMYK color files are then digitally processed by the CPU using an error diffusion method to generate data files containing representations for each of the CMYK process colors wherein the representations correspond to random fixed size dot representations containing information corresponding to color density and placement for each pixel of the color image. Color separation prints can then be output which can than be aligned and used to print a composite color image reproduction.

13 Claims, 7 Drawing Sheets

SYSTEM AND METHOD FOR COLOR IMAGE REPRODUCTION FROM COLOR SEPARATIONS PREPARED FROM RANDOM FIXED SIZE DOT PLACEMENT

A portion of the disclosure of this patent document contains material to which a claim of copyright protection is made. The copyright owner has no objection to the facsimile reproduction by anyone of the patent document or the patent disclosure, as it appears in the Patent and Trademark Office patent file or records, but reserves all other rights in the copyrighted work.

I. BACKGROUND OF THE INVENTION

A. The Field of the Invention

The present invention relates to color image reproduction systems and methods, and in particular to a system and method for color image reproduction from color separation prints prepared from random fixed size dot placement generated utilizing a digital computing system.

B. The Prior Art

The colors seen in the reproductions contained in most magazines, newspapers, color brochures and the like are typically created from an optical illusion which results from a process called "halftoning." In such publications, a color image is reproduced from a continuous-tone original such as a color print, a 35 mm slide, or other film transparency. However, conventional computer printers and printing presses can not reproduce a continuous range of color. With rare exception, computer printers and printing presses simply reproduce either total color tone or nothing. While there are some new technologies in electronic copiers that are being introduced that are capable of placing variable amounts of color, they typically tend to be very expensive and are not viable for large volume printing in most cases.

Consequently, the only way computer printers or printing presses can print variable, continuous ranges of color tone is through the use of halftone dots to create the impression of various colors. For example, a gray tone can be created by printing the black ink in a pattern of tiny dots and letting the white of the paper show through and mix with the black dots to create the impression of gray. Rendering an image into these dots is called halftoning.

The continuous range of color seen in most magazines and other color publications is reproduced using halftoning. The four standard printing ink colors (called "process colors") used in such halftoning process are cyan, magenta, yellow and black (referred to as "CMYK" where K stands for black). Together with the background white of the paper the halftone dots created using these process colors can be used to produce an infinite variety of shades and color tones.

The degree of sharpness or resolution of a color reproduction prepared by halftoning is a function of a variety of factors. One factor is the screen density or number of dots per linear inch which is used. The human eye will typically effectively blend halftone dots with a high degree of resolution at screen densities of 130–150 dots per linear inch (dpi). Lower resolution color image reproductions are also commonly utilized based on screen densities of 85–100 dpi, as for example in many color photographs and charts reproduced in newspapers.

Color image reproductions are typically prepared using separate color prints or plates for each of the process colors. Thus, in order to print a color image it must typically be separated into four halftone images, one for each of the standard process colors. Such color separation can typically be accomplished by preparing separate photographs utilizing a camera or scanner through which different color filters are used to filter out all the colors of an image except those areas that print in a particular process color. Electronic separation systems are also available which eliminate the need for outside camera work by analyzing the color content of a digitized image and separating the image into its constituent process colors. Either way, the result of the separation process is four separate prints or films. Once the color separation prints or films have been prepared, they are then utilized to prepare composite color image reproductions. This is typically done by taking each color separation print, which can be either a positive or a negative print, and using that print for screening the particular process color for that print onto the page which is to contain the color image reproduction. By doing this successively with each of the separation prints or films, a composite color image is reproduced.

The quality of a color image reproduction is determined by the degree of resolution or sharpness of the reproduced image as well as how faithfully the reproduced image corresponds in color to the original image. This in turn means that the quality of the separations is of primary concern. Not only must the color of the various color separation prints or films be faithfully reproduced, but the alignment of the various separation prints is also a critical factor. Furthermore, the manner in which the halftone dots of each of the color separation prints are prepared can also dramatically affect how faithfully the original colors are reproduced as well as the clarity or sharpness of the image.

For example, the color density of a particular color is controlled in the prior art halftoning processes by increasing the size of the dots. The halftone dots are maintained in a fixed pattern so that they are equally spaced, however the size of the halftone dots will be varied in order to selectively increase or decrease the density of a particular color. Since the four process colors are layered or printed on top of each reproduction the result is usually a tiny "rosette" consisting of four different colored dots of various sizes blended to create the desired color at any particular point on the color image reproduction. Together the halftone rosette dot patterns blend together to create the complete image reproduction. As noted, depending upon the density of the halftone dots per lineal inch, sharpness and resolution of the image can be improved.

The exact shape, size and spacing between the dots can change, but a fixed pattern of dots, aligned between layers of different colors is used by virtually all color separation and computer generated images that are currently in commercial usage.

Since the placement of the dots is fixed, as noted the density of each color is changed by varying the size of the dots. For example, if fifty percent of the magenta color is needed for a particular part of an image, the halftone dots are enlarged to cover fifty percent of the paper for that portion of the image. If a light green color is required, that color can be created by using a yellow dot overlaid with a cyan dot. By varying the size of each process color halftone dot which composes a single dot in the reproduction, virtually all colors can be achieved.

To simulate variable dot size using a computer printer, a matrix of smaller dots is printed. This technique is called a "dither pattern." For example, it is not uncommon for a computer printer to create variable sized dots by using a matrix of dots which is 5×5. The computer prints a selected number of dots in the matrix to produce halftone dots of sizes. However, one of the disadvantages of this is a sacrifice with respect to the final resolution of the computer printer. For example, if a printer is capable of 300 dots per inch use of a 5×5 dot matrix to create variable sized dots will limit the printer to 60 (300÷5) halftone dots per inch instead of 300 dots per inch.

Another common problem which arises from halftone processes which are based upon utilizing variable sized dots and fixed dot patterns in the standard process color separation prints is that the alignment of the color separation prints is critical. This is especially difficult to detect and often shows up only at the final composite reproduction stage. If the color separation prints are improperly aligned or registered with respect to each other, the various halftones will tend to create a moiré pattern which will make the composite color image appear blurred as if it were originally photographed out of focus.

Still another problem which arises from halftone processes that utilize variable size dots and fixed dot patterns in preparing standard process color separation prints is the problem of reproducing the exact dot size, particularly where the dot size may vary in accordance with the color density required for a particular process color or colors. In conventional halftone printing processes where variable dot sizes are used, small dots are especially difficult to print. The smallest dots can often be lost or easily doubled in size due to errors in reproduction. The most common problem is growth of the dot size. In offset printing the dot is first transferred to film for the separation, then it is transferred from the separation to the printing plate, the ink is then transferred from the plate to a roller and then finally the ink is transferred from the roller to the paper. In each of the foregoing steps there is a tendency for the dot size to grow. Since the halftone dots will vary in size they will grow at different rates, thus changing the relationship in the size of the dots in each of the rosette patterns which in turn will affect whether the colors are faithfully reproduced for the image.

What is needed in the art is a system and method of color image reproduction which addresses and substantially overcomes many of the problems and limitations which presently exist under the state of the art as represented by typical commercial color image reproduction systems that are presently available.

II. PRINCIPAL OBJECTS AND BRIEF SUMMARY OF THE INVENTION

In view of the present state of the art, it is a principal object of the present invention to provide a system and method for color image reproduction utilizing a digital computing system to generate random placement of fixed sized dots so as to substantially eliminate many or most of the misalignment difficulties while nonetheless preserving high quality resolution and faithful color reproduction.

Another important object of the present invention is to provide a system and method for color image reproduction utilizing digital computing systems in a manner which does not limit the number of dots per inch which can be printed using such digital computing systems and which requires less data to store the same amount of information.

Another important object of the present invention is to provide a system and method of color image reproduction wherein the halftone dots are all of the same size so as to substantially minimize or eliminate the necessity for reproducing relative sizes of variably sized halftone dots thereby substantially reducing or eliminating the problem of halftone dot size growth.

Still another important object of the present invention is to provide a system and method for color image reproduction utilizing digital computing systems which require fewer pixels for computation thereby speeding up throughput and eliminating other associated problems such as edge break-up.

These and other objects and features are realized in the present invention, as will become more apparent from reference to the accompanying drawings, detailed description of the present invention and claims, or from the practice of the invention.

Briefly summarized, the present invention comprises a system and method of color image reproduction wherein a composite color image is reproduced from digitally processed data utilizing a random fixed size dot placement rather than the variably sized fixed halftone dot patterns as used in the prior art halftone processes. The method of the present invention can be implemented utilizing standard digital computer graphics and digital computing systems, and can be used to prepare color separations usable in a variety of applications, such as facsimile transmission of color images, color separations for printing using conventional computer printers, offset printing, screen printing, large format printing and printing on flexible material such as vinyls and textiles, with high quality resolution and clarity.

In a preferred method of the present invention, a color image is digitized so as to prepare a digital file containing information corresponding to density and placement of red, green and blue (RGB) colors contained in the image and the digital RGB file is electronically stored and then later input to a CPU for digital processing. The RGB file is then transformed into corresponding standard CMYK process color information contained in a CMYK color file which is electronically stored and digitally processed so as to derive therefrom color separation files each containing a representation of density and placement of one of the standard CMYK process colors, and wherein each representation is comprised of a random placement of fixed size dots. The color separation prints for each of the standard CMYK process colors is then output on an appropriate output device such as a printer and thereafter the composite color image is reproduced from the prints using standard techniques for overlaying so as to prepare the composite image.

III. BRIEF DESCRIPTION OF THE DRAWINGS

Reference is next made to a brief description of the drawings, in which FIG. 1 is a schematic diagram which generally illustrates color image reproduction in accordance with the system and method of the present invention.

IV. DETAILED DESCRIPTION OF THE PRESENTLY PREFERRED EMBODIMENT OF THE INVENTION

Figure 1:
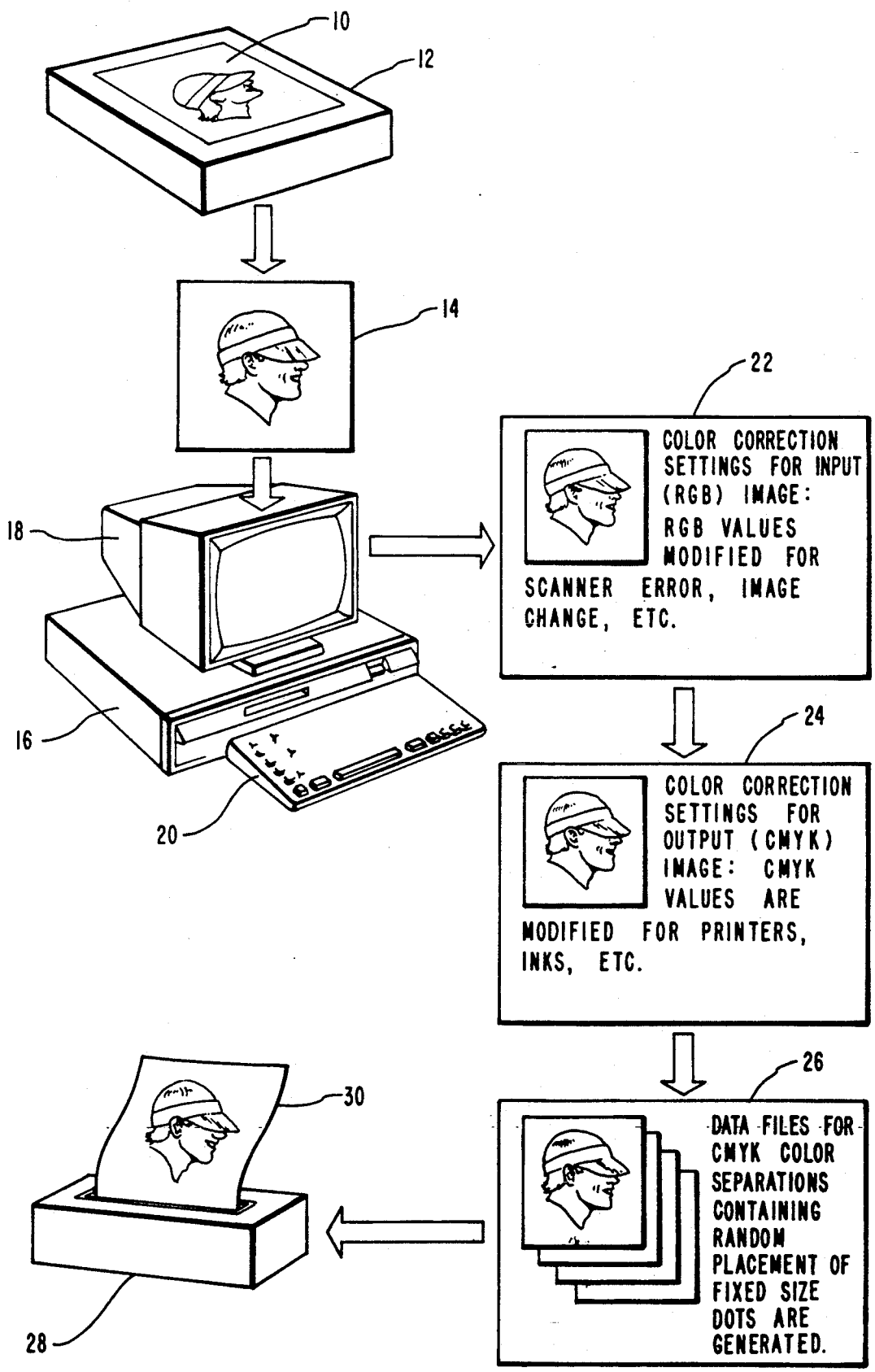

A. General Description and Theory of the Overall Color Image Reproduction Process

1. Data Input

Data input begins with reading digital information from an input device that can input an image, such as a scanner, for each separate color layer wanted for final separation. The input device is not limited to only those that can separate individual colors. The input device can input all or part of the color layers at any instance of input from that device. The actual color layer separation of an image can be performed inside the computer system after a composite image has been input from the input device. The digital information that is read in from an input device has a length that is only limited by the size limitations of the input device, or the size limitations imposed by the computer software, or by any other means of limiting size. This digital information from the input device can then be stored into the memory of the computer system, or onto any other storage device for temporary or permanent storage and recall. The digital information for each color layer does not have to contain the same amount of information as any other color layer on input, but preferably contains the same amount of digital information on output. Information describing each color layer (sizes, color, etc.) should be either stored with each layer or stored separately with a means of linking the layer description to the digital information for that layer.

2. Two Stage Color Correction

After the initial input of an image, the image can be color corrected for each layer or all layers composed together. The color correction phase may be separated into two steps. The first step is color correction of the input (e.g., RGB) colors of the image and the second step is color correction of the output (e.g., CMYK) colors of the image. The input color correction step is necessary to correct colors due to color flaws introduced by the input device, or by external environment conditions such as lighting, or by internal computer system conditions such as lost data bits, or electronic filters, or by encoding of information from input. The input color correction step is performed by mapping all or part of the digital information for the image into a suitable representation of digital information used by the output color correction step. For example, if input data ranged from a numeric value of 0 to 100 and the input device changed all numeric values of 5 to 10 because of an input device error or cause, the input color correction phase could change all numeric values of 10 back to 5, or even make a dramatic change of mapping the range of input from 0 to 100 to a range of −32.4 to 0.98427. Input color correction preferably maps digital information into a form suitable for input to the output color correction step.

The output color correction step is necessary to correct colors for inks used in the final composition of the output color separations, or flaws that can introduce any color alternation problems from the output device or the final method of composing the reproduced image. The output color correction step is performed by mapping all or part of the digital information received from the input color correction step into a suitable representation of digital information used by the final output process. This process is similar to the input color correction process such that both color correction steps map correction settings into all appropriate numeric values of the data corresponding to the corrected color.

An example of input and output color correction phases starts with a scanner that inputs a scanned photograph into a computer system. The scanner sends data in RGB format. When the scanner scans a small portion of the photograph, it first sends an intensity level of red in a numeric range, for example, 0 to 255. Then, it sends an intensity level of green in the same range of numeric values, and then sends a blue level of intensity in the same range.

The computer system receives these three values which constitute 24 bits of information. A typical computer system can only display RGB values that are 21 bits in length, therefore a translation of values from 0-255 to values from 0- 127 is performed. Each translated RGB value is then stored into successive memory locations to be retrieved by the input color correction step.

After all data is input from the scanner and the image is displayed on the computer monitor, if the computer operator may notice for example that the red values that came in from the scanner were too high because there is a reddish tint to the image displayed on the monitor, the input color correction phase may be initiated.

The input color correction phase allows the operator to correct the RGB values that came in from the scanner. Since in the above example the operator would like to lower the values of the red components of the image, the input color correction step allows the operator to do this by choosing the value to be changed and then choosing the new value with which to replace it. The computer system recognizes values between 0 and 127, so the operator may choose a range of values such as 100–127 to be changed and then choose the new range to be 90–115.

The new range for red values is then mapped over the entire image on the monitor and the operator may choose to correct any other range of RGB values if the image is not adequately color corrected. Once the operator is satisfied with all input color correction changes, the output color correction phase is initiated.

The computer will map the RGB values into similar CMYK values because the printing industry uses CMYK instead of RGB values. The cyan components are found by inverting the red component values from 0-127 to 127-0. The magenta components are found by inverting the green component values from 0-127 to 127-0. The yellow components are found by inverting the blue component blues from 0-127 to 127-0. The black components are found from calculating the lowest intensity of cyan, magenta, or yellow at any one point in the image. For example, if red, green, and blue values were 50, 67, and 32, respectively, then the CMYK values would be $127-50=77$, $127-67=60$, $127-32=95$, and $\min(77,60,95)=60$, respectively.

The output color correction phase allows the operator to adjust CMYK values instead of RGB values because the final output is printed with CMYK inks. Black is only used as a shadow highlight in the final composite image, therefore the black values are mapped to a very low range. For example, black values 0-100 are mapped to 0 and black values 101-127 are mapped to 1-20 as an upward ramping curve. This will only give black in the shadow areas. The operator then adjusts the cyan, magenta, and yellow values to suit the printing inks.

By lowering the values in a color, the operator decreases the amount of ink for that color that is laid down on the material onto which the final composite image is reproduced. By raising the values in a color, the operator increases the amount of ink for that color that is laid down.

After the operator is satisfied with input and output color correction, the data for the CMYK colors is digitally processed to generate random placement of fixed size halftone dots for each color separation print.

3. Random Placement of Fixed Size Halftone Dots

R. W. Floyd and L. Steinberg introduced a grey scale method called error diffusion. Floyd, R. W., and Steinberg, L., "An Adaptive Algorithm for Spatial Grey Scale," SID 75 Digest. *Society for Information Display*, 1975, pp. 36-37.

The method of Floyd and Steinberg's error diffusion is as follows.

Given an m×n array A of real values between 0 and 1, it is desired to construct an m×n array B of zeros and ones such that the average value of the entries B[i,j] when (i,j) is near $(i_0,j_0)$ is approximately equal to $A[i_0,j_0]$. A represents the light intensities in an image that has been scanned; B represents a binary approximation to the image that might appear on the screen of a personal computer or on the pages produced by a laser printer. Floyd and Steinberg computed B from A by applying the following steps:

```
for i := 1 to m do for j := 1 to n do
  begin if A[i,j] ≤ .5 then B[i,j] := 0 else
  B[i,j] := 1;
  err := A[i,j] - B[i,j];
  A[i,j+1] := A[i,j+1] + err * alpha;
  A[i+1,j-1] := A[i+1,j-1] + err * beta;
  A[i+1,j] := A[i+1,j] + err * gamma;
  A[i+1,j+1] := A[i+1,j+1] + err * delta;
  end.
```

Here alpha, beta, gamma, and delta are constants chosen to diffuse error, which is directed proportionately to nearby pixels whose B values have not yet been computed. Floyd and Steinberg suggested taking (alpha, beta, gamma, delta)=(7/16, 3/16, 5/16, 1/16).

The Floyd-Steinberg method often gives excellent results, but it has drawbacks. In the first place, it is an inherently serial method; the value of B[m,n] depends on all m,n of the entries of A. Furthermore, it sometimes puts "ghosts" into the picture; for example, when a face is treated by this approach, echoes of the hairline may occasionally be seen in the middle of the forehead.

The ghosting problem can be ameliorated by choosing (alpha, beta, gamma, delta) so that their sum is less than 1; then the influence of A[i,j] on remote elements decays exponentially. However, the ghosts cannot be exorcised completely in this manner. Suppose, for example, that A[i,j] has the constant value a for all i and j, and let alpha+beta+gamma+delta=theta≦1. If a is very small, the entries of B[i,j] for small i will all be zero, and the entries of A[i,j] will build up to the limiting value $$a(1 + \text{theta} + \ldots + \text{theta } (i-1))(1 + \text{alpha} + \text{alpha } 2 + \ldots) =$$
$$a(1 + \text{theta} + \ldots + \text{theta } (i-1)) / (1 - \text{alpha})$$

for large j. If a is chosen so that this value is just slightly less than ½, the (i+1)st row will suddenly have many of its B values set to 1, after they had been 0 in all previous rows.

It has been found that ghosts disappear if the intensities A[i,j] are rescaled. For example, each A[i,j] can be replaced by 0.1+0.8A[i,j]. This works because the human eye is more sensitive to contrast than to absolute signal levels.

When the Floyd-Steinberg method was used on an image using a conventional 300-pixel-per-inch laser printer, non-linear effects of the xerographic process caused large dark blotches to appear in places where white pixels were fairly rare; there was a sharp jump between gray and black areas.

The method of the present invention uses a modified error diffusion method that has the advantage of eliminating most ghosting that occurs and uses less pixels for computation than the convention error diffusion method (6surrounding pixels as opposed to 12 surrounding pixels) thereby speeding up throughput and eliminating some edge break-up problems inherent in the conventional error diffusion method. The modified error diffusion method is described as follows.

The pattern of computation of an error for a particular pixel within the image is defined to be:

TABLE 1

| | Pixel number | | |
|---|---|---|---|
| | | 1 | |
| | 2 | 3 | 4 |
| 5 | 6 | P | | where P is the current pixel of calculation. If notation is borrowed from Floyd-Steinberg where (i,j) is the current pixel, the error diffusion locations used would look as follows:

| | | E[i,j−2] | |
|---|---|---|---|
| | E[i−1,j−1] | E[i,j−1] | E[i+1,j−1] |
| E[i−2,j] | E[i−1,j] | A[i,j] | | where E stands for the already calculated error for the corresponding pixel and A is the value from output color correction to be used to find E[i,j]. Along with the pixel numbering, there is also a pixel weight value attached to each numbered pixel. A useful weight table is:

TABLE 2

| Weight Pixel | | | |
|---|---|---|---|
|   |   | 2 |   |
|   | 3 | 3 | 3 |
| 2 | 3 | P |   |

This weight table is useful because the weight factors add up to 16(3+3+3+3+2+2=16) and a division by 16 can be substituted by a right shift of 4 bits to the sum of the errors. Any values can be used for the weight table subject factor greater than the pixels farther away from the current pixel (P). Another constraint that is optional has to do with the fact that diagonal pixels are farther away from the current pixel than adjacent pixels to the left (Table 1, pixel 6), and top (Table1, pixel 3) of the current pixel; therefore, the diagonal pixels (2 & 4) should have a weight factor less than the weight factors of the adjacent pixels (3 & 6). Pixels 1 and of Table 1 should have the lowest weight values.

The steps for calculating the B array (the output array) from the E and A arrays along with the weight factors are as follows (assuming A values are in the range of 0 to 1, and the E values are in the ranges of [−0.5, 0.5] and indexes to arrays always start at 1):

```
for i := 3 to m+2 do
    for j := 3 to n+2 do
    begin
        E[i,j] := A[i,j] +
            [(E[i,j−2] * W1) + (E[i−1,j−1] *W2)
            + (E[i,j−1] * W3) + (E[i+1,j−1] * W4)
            + (E[i−2,j] * W5) + (E[i−1,j] * W6)]
            / (W1 + W2 + W3 + W4 + W5 + W6);
        if E[i,j] < .5 then B[i−2,j−2] := 1 else
        begin
            B[i−2, j−2] := 0;
            E[i,j] := E[i,j] − 1;
        end;
    end.
``` where W1, W2, W3, W4, W5, and W6 are the weight factors for each respective point and m and n are the dimensions of the total pixels. In the example where the RGB values are inverted to calculate CMYK values, the if statement can be written in this manner:

```
if E[i,j] < .5 then B[i−2, j−2] := 0 else begin
    B[i−2,j−2] := 1;
    E[i−j] := E[i,j] − 1;
end;
```

If the A values are not assumed to be between 0 to 1, and E values are not assumed to be between [−0.5, 0.5], the range can be:

```
range of A: [Q,R]
range of E: (3Q−R)/2 (Q+R)/2
        and Q ≦ R
```

Therefore, the general if statement becomes:

```
if E[i,j] < (Q+R)/2 then B[i−2,j−2] := 0 else begin
    B[i−2,j−2] := 1;
    E[i,j] := E[i,j] + (Q−R);
end;
```

All of the above equations are for positive color separation prints. In the color lithography industry, the computer system must be able to print negatives also. In order to do this, one must "not" all B values at the end of error diffusion calculation with the following loop:

```
for i := 1 to m do
    for j := 1 to n do
        B[i,j] := 1 − B[i,j];
``` or change the error diffusion steps to automatically "not" the B value upon each calculation of B[i,j]. For non-inverted calculations, the if statement becomes:

```
if E[i,j] < (Q+R)/2 then B[i−2,j−2] := 0 else begin
    B[i−2,j−2] := 1;
    E[i,j] := E[i,j] + (Q−R);
end;
```

For inverted calculations, the if statement becomes:

```
if E[i,j] < (Q+R)/2 then B[i−2,j−2] := 1 else begin
    B[i−2,j−2] := 0;
    E[i,j] := E[i,j] + (Q−R);
end;
```

The double "for" loop in the method iterates through the entire m×n array and the "i" indexes can become 1 to m+3. This means that the buffer holding the E values must have m+3 E locations per line of calculation. Also, the "j" indexes can become 1 to n+2 which indicates that only 3 lines of buffer for E values must be maintained throughout calculation. Therefore, instead of allocating (m+3)×(n+2) buffer locations for E values, one may allocate (m+3)×3 buffer locations for E values and change the algorithm to:

```
for i := 1 to n do
begin
    for j := 3 to m+2 do
    begin
        E[3,j] := A[3,j] +
            [(E[1,j] * W1) + (E[2,j−1] * W2) +
            (E[2,j] * W3) + (E[2,j−1] * W4) +
            (E[3,j−2] * W5) + (E[3,j−1] * W6)]/
            (W1 + W2 + W3 + W4 + W5 + W6);
        if E[3,j] < (Q+R)/2 then B[i,j−2] := 0 else begin
            B[i,j−2] := 1;
            E[3,j] := E[3,j] + (Q−R);
        end;
    end;
    for k := 1 to m+3 do
    begin
        E[1,k] := E[2,k];
        E[2,k] := E[3,k];
    end;
end.
```

To save on B buffer memory, the B values can be output as they are calculated. If 8 bits per byte are sent to a printer/plotter as B data, initialize an accumulator to zero and buffer 8 B values (1 bit per value) before sending the byte to the printer/plotter.

Since initial E values for the first 2 rows of the E matrix and the first 2 E values and last E value for the third row of the E matrix are needed for the first 2 rows of output B matrix, the E matrix must be initialized with an initial E value. If the value (I) for initializing the E matrix is in the range [Q, (Q+R)/2), then the perimeter of the image will tend towards having a dark outline which also diffuses into the contents of the image. If a value (I) for initializing the E matrix is in the range [2Q−(3Q−R)/2, Q], then the perimeter of the image will tend towards having a light outline which also diffuses into the contents of the image. Therefore, one should choose the mid-range value for E which is Q so that the perimeter will not have an outline.

The E matrix should be initialized before calculating any E values for final output. One can initialize the entire E matrix by using the following steps:

```
for i := 1 to m+3 do
begin
    E[1,i] := Q;
    E[2,i] := Q;
    E[3,i] := Q;
end.
```

An equivalent method is:

```
for i := 1 to 3 do
    for j := 1 to m+3 do
        E[i,j] := Q.
```

If speed is an issue, or if the m dimension is very large, consider initializing only the E values that require initialization. The following two equivalent algorithms accomplish this:

```
for i := 1 to m+3 do
begin
    E[1,i] := Q;
    E[2,i] := Q;
end;
    E[3,1] := Q;
    E[3,2] := Q;
    E[3,m+3] := Q;
        -or-
for i := 1 to 2 do
    for j := 1 to m+3 do
begin
    E[i,j] := Q;
    E[3,1] := Q;
    E[3,2] := Q;
    E[3,m+3] := Q;
end.
```

4. Direction of Input Data (Mirror Images and Flips)

Normal data scanning of the A array will produce a copy of the original image. The normal data scanning directions are from left to right, and top to bottom, as in reading a book. If a mirror image of the original image is wanted, the A data should be processed in the error diffusion method scanning from the right to left, and top to bottom. The picture can be flipped upside down by scanning bottom to top instead of top to bottom. If a transparency is used as the material printed on for final output, any of the above scanning methods can be simulated by rotating or flipping over the transparency.

5. Expanding or Shrinking an Image

If it is desired to expand or shrink the data to achieve larger or smaller images, this should be done prior to entering the error diffusion steps. There are many ways to expand and/or shrink data. Descriptions of three methods follow.

Expanding by duplication. This method of expansion is the simplest and fastest, but introduces an error in the image called stair-stepping. Stair-stepping is visible mostly in diagonal lines and has the appearance of a set of stairs instead of having a smooth diagonal line. The general method for expanding by duplication requires three variables. The first variable (V1) stores the value for how many pixels are input. The second variable (V2) stores the value for how many pixels are output. The third variable (V3) is initialized to 0 and is used to accumulate V1 values. The method starts out by checking if V3 < V2, and if so, then output the first pixel of the original image and add V1 to V3. If V3 ≧ V2 then subtract V2 from V3 and do not output a pixel but advance to the next pixel in the original image and recheck V3 ≧ V2 and advance until V3 < V2, at which time use the new pixel for output and then add V1 to V3. This process continues until all V2 pixels have been output or all V1 pixels have been used.

Shrinking by elimination. This method of shrinking is the simplest and fastest, but also introduces stair stepping and has additional problems due to elimination of data. This method uses the same three variables that expanding by duplication uses, the only differences being that V1 and V2 swap meanings. V1 is used to store how many pixels are to be output, and V2 is used to store how many pixels are input. The expand-by-duplication process is then used to shrink the image.

Expanding and shrinking by interpolation. This method is much harder than duplication and requires approximately 3-10 times more calculation time, but eliminates most stair-stepping problems. An interpolation method is discussed in Appendix A, incorporated herein by reference.

6. Sectional or Strip Printing

Most printer/plotters have limitations of length and width of print media. For example, laser printers will usually have a media cartridge which allows printing on an 8½×11 inch piece of media. Other printer/plotters, such as electrostatic plotters, will have a 24 to 48 inch width media carried on a continuous roll up to a maximum length, usually in the range of 500–1000 feet. These limitations of length and width require the system software to handle lengths and widths the capability of the output device. The system software can incorporate a method of printing sections or strips (similar to wallpaper strips) to overcome this problem. By incorporating a method of printing sections or strips, images can be created for billboards, large silkscreens, or the side of a building.

7. Output Device Resolution

Resolution of pixels (meaning pixels or dots, per inch) should be variable within the system software according to the output devices used. A laser printer will usually have resolutions in the range of 300 to 600 dots per inch (dpi). An electrostatic plotter will usually have resolutions in the range of 50 to 400 dpi. The resolution desirable in conventional halftones for magazine quality is 120 lpi (lines per inch). Computer generated halftones using patterns (or dither) must simulate 120 lpi by choosing a matrix of dots for the patterns, such as a 5×5 matrix and increase the output resolution by purchasing higher resolution output devices. For example, many laser printers incorporate a 5×5 matrix for a 300 dpi device which results in a 60 lpi halftone image (300/5=60). In order to simulate 120 lpi, a 600 dpi printer/plotter must be purchased and then the image will result in a magazine quality output (600/5=120). This is also true for the modified error diffusion method, except that a 400 dpi printer/blotter will produce a magazine quality image and a 600 dpi printer/plotter will produce greater than magazine quality. This is because error diffusion does not produce a fixed pattern of dots and therefore does not limit output resolution.

8. Alignment and Registration Marks

Misalignment of separation prints can cause ghosting problems and in the case of patternized halftones, can cause moiré patterns. The output separation print should be accompanied by registration marks on each corner or side of the print to align the prints together. Laser printer technology uses high degrees of heat to adhere dry toner to the media and thus has a side effect of shrinking or expanding the media. Different layers of separation created on a laser printer will therefore sometimes have poor alignment due to varying image sizes of each separation. In this case, patterns used for halftoning will create moiré patterns, whereas, error diffusion will not. Error diffusion allows a greater degree of tolerance with respect to misalignment. This fact is critical for the silkscreen industry and for small press facilities because typical alignment equipment is quite inaccurate.

9. Editing and Rendering an Image

Editing and rendering an image consists of modifying individual colors of the image and/or adding features to the image. Such features can include adding alphanumerics of different sizes, performing a formula over the entire image or part of it, and allowing the user to brush in effects much like an artist would do with a paintbrush. Rendering uses an interpolation method to keep as much color detail in the image as possible, but color data may still be lost. Editing may or may not use an interpolation method and thus can lose some color data during the editing session. The user should be able to edit and render any image at any time during the color separation process. This may be accomplished by separating the edit and render options from the color separation process and allowing the user to jump in and out of either process at will.

B. The Illustrated Embodiment of Color Image Reproduction Using the Method of Random Placement, Fixed Size Dots Reference is next made to a detailed description of the drawings which illustrate one presently preferred embodiment of the invention and the presently understood best mode for making and using the invention, and wherein like parts are designated with like numerals throughout.

The overall color image reproduction process of the present invention is summarized in a schematic fashion in FIG. 1. As there illustrated, a composite color image 10 is first digitized so as to prepare digital data for the image which contains information corresponding to intensity and placement of each of the colors contained in the image. The color image can be digitized, for example, by utilizing a conventional scanner 12. Scanner 12 defines the image in terms of a plurality of pixels each of which is represented by an x-y coordinate position and an array of digital values A[i,j] is prepared such that each value A in the array represents the density and placement of one of the colors scanned from the image 10 at each pixel. In this manner, a digital file is prepared which can be electronically recorded and input as schematically indicated at 14 to a central processing unit (CPU) 16. The digital data that is prepared and input to the CPU 16 is only limited by the size limitation of the particular input device or the size limitation imposed by the computer software running the CPU 16. The digital data input to the CPU 16 can then be stored in the memory of the CPU 16 or in any other storage device or medium for temporary or permanent storage and recall. Input devices other than a scanner, as for example a camera or graphics editor, could be used to prepare the digital file, which in the illustrated embodiment would typically consist of a digital RGB file containing information corresponding to density and placement of RGB colors contained in each pixel of the image.

Once the color image 10 is digitized and the corresponding data has been input to the CPU 16, the data is then digitally processed by the CPU 16 so as to derive from the data a plurality of separate digital files each containing a representation of density and placement of one of the colors separated from the image such that each representation is comprised of a random placement of fixed size dots. In the presently preferred embodiment, the digital processing can optionally include two color correction phases as described above and as schematically indicated at 22 and 24 in FIG. 1. The color correction step indicated at 22 involves the input to CPU 16 of a color correction setting of the input image as represented by the digitized RGB file that is input from scanner 12. For example, the input image can be displayed at terminal 18 so that it can be ascertained whether due to color changes occurring when the image 10 was scanned any of the separate RGB colors need to be modified with respect to their color density. If so, an appropriate correction setting can be entered so as to rescale the values with respect to density of the color or colors which need to be corrected.

Once the color correction settings, if any, for the input RGB color image have been processed, CPU 16 then transforms the RGB colors as described above into the standard process CMYK colors which are used in connection with the printing inks. As schematically represented at 24 in FIG. 1, color correction settings can then be entered and digitally processed with respect to the output CMYK color image. The color correction settings in both steps 22 and 24 of the digital processing are mapped into all corrected colors for the appropriate ranges identified and in accordance with the new ranges which define the correction settings.

Once the input and output color correction steps are completed, the CPU 16 then digitally processes the data so as to prepare separate or combined CMYK color files containing a representation of density and placement of one or more of the standard CMYK colors and wherein each representation is comprised of a random placement of fixed size dots. The digital computing system can then output at a printer 28 or other output device, color separation prints such as schematically indicated at 30 for each of the separate CMYK process colors. In accordance with standard printing processes, the color separation prints 30 can then be aligned and used to prepare a composite color image reproduction.

Figure 2:
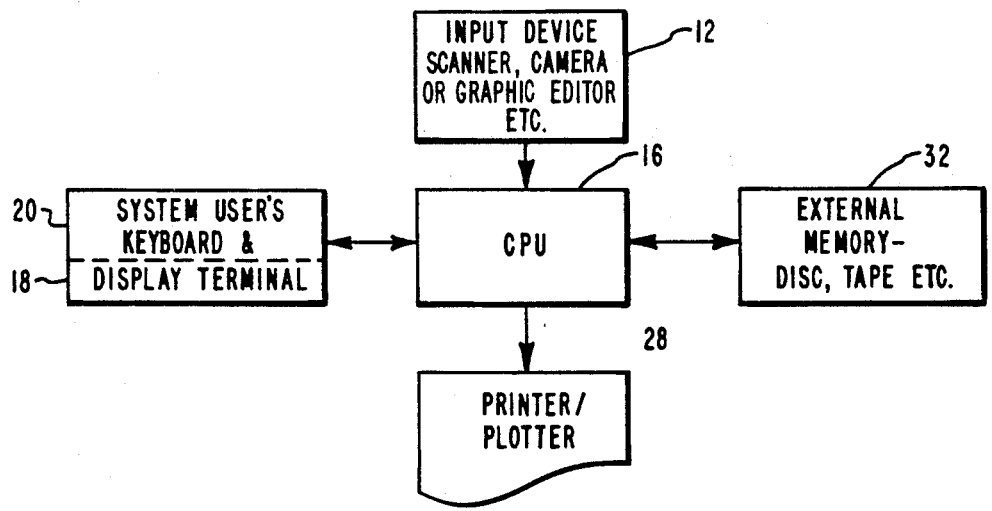
FIG. 2 is a functional block diagram that schematically illustrates a digital computing system for utilization in accordance with the system and method of the present invention for color image reproduction.

FIG. 2 illustrates a conventional digital computing system which may be used in conjunction with the method of the present invention, and includes a CPU 16 which may be a main frame, mini or personal computer 16. The system includes an input device 12 as described above which may consist of a scanner or camera from which the input data for each of the RGB or CMYK colors can be digitized and prepared for input to the CPU 16. The system may further include an external memory such as a disk or tape as schematically indicated at 32 for purposes of storage of data which is input or processed, which may be in addition to memory storage provided as part of the CPU 16. The system also includes a system user keyboard 20 and a mouse or tablet display terminal 18 as also illustrated in FIG. 1 and appropriate output devices such as a printer/plotter 28.

Figure 3A:
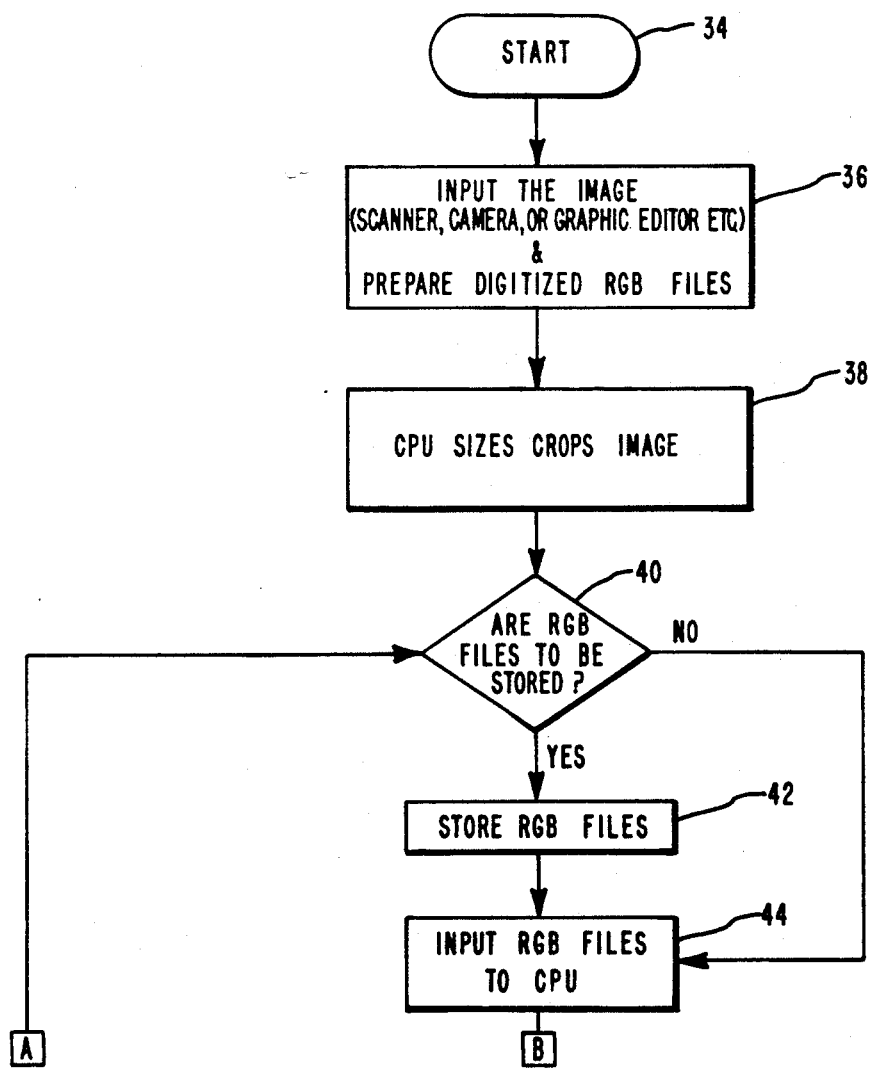
FIGS. 3A and 3B are flow charts illustrating one presently preferred embodiment of the method for color image reproduction utilizing the digital computing system of FIG. 2.
Figure 3B:
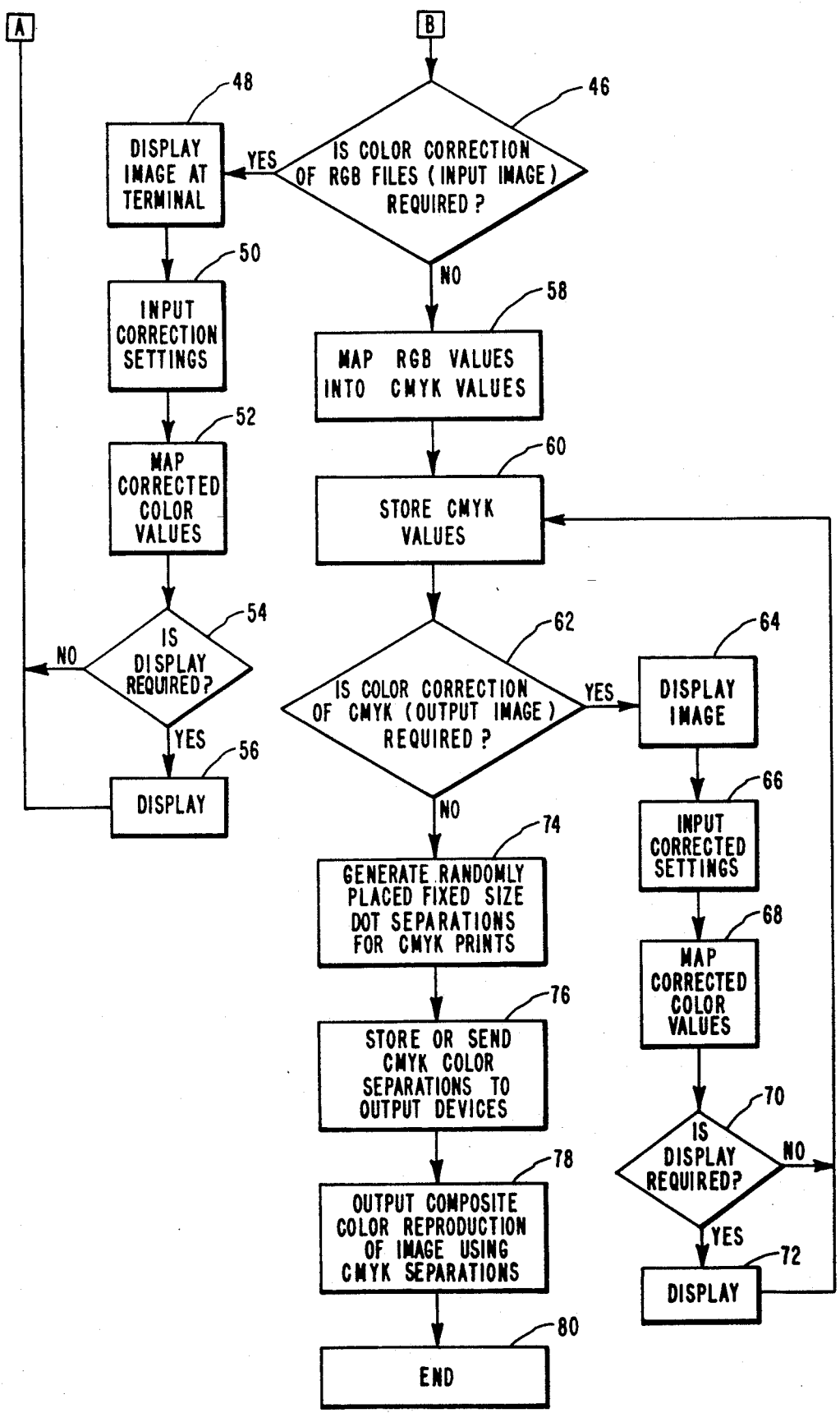

One presently preferred embodiment of the overall method of color image reproduction is generally illustrated in the flow chart of FIGS. 3A-3B. As there illustrated, the method starts at step 34 which schematically represents system initialization with respect to the operating system of the digital computing system and loading of the program instructions for controlling the CPU in accordance with the method of the invention into the CPU memory. Next, as represented at step 36 a digitized RGB file is the input by means of a scanner, camera or graphics editor and then the image is prepared with respect to its size, cropping, positioning, as represented at step 38.

In accordance with the illustrated method of the present invention, at step 40 the digitized RGB files may be optionally stored, as for example in the external memory 32 (see FIG. 2). If the digitized RGB files are not stored the method advances to step 44 for input of the digitized RGB files to the CPU, otherwise if the RGB files are to be stored the method advances to step 42 where the RGB files are stored in the appropriate memory locations such as external memory 32.

The method then advances to step 46 where it is determined whether color correction of the digitized RGB files is required. If so, as indicated at step 48 the image is displayed at the user terminal and then as indicated at step 50 appropriate correction settings may be input at the keyboard, mouse or tablet of the user's terminal. The CPU then proceeds to map the color correction settings for each of the color values which are to be corrected as indicated at step 52 and as also described above. At step 54 it is then determined whether further display of the input image is required and if not the method returns to step 40, otherwise the image is again displayed as indicated at step 56 prior to returning to step 40.

If color correction of the RGB color files of the input image is not required, the method then advances to step 58 and the CPU proceeds to map the RGB color values into corresponding CMYK color values by inverting the RGB values in the manner previously described. The CMYK values are then stored as indicated at step 60 and as shown at step 62 it is then determined whether color correction of CMYK color values is required If so, the image is again displayed as indicated at step 64 and the appropriate color correction settings are input at the user's keyboard, mouse or tablet as indicated at step 66. The color correction settings are then digitally processed by the CPU so as to map the corrected color values into each of the colors for which the correction settings have been identified, as indicated at step 68 and it is then again determined at step 70 whether further display of the image is required. If not, the method returns to step 60 and if so the image is again displayed as indicated at step 72.

If color correction settings of the CMYK output colors are not required at step 62, the method proceeds to step 74 where the CPU then continues with digital processing in order to generate data files representing randomly placed fixed size dot separations which can be used for preparing separate CMYK color prints. As used herein, "random pattern" or "random placement" means that the dots for each color separation are placed based on 1) color density (e.g. dots tend to be placed in areas according to density of color, as noted in connection with FIG. 5 below), and 2) according to the detail of the image (e.g. dot placement follows and enhances detail of the image). However, no rosette or other fixed pattern is created and there is no alignment of dots between color separation layers.

Digital files containing the information for the random placement of fixed size dots for each of the CMYK color prints is then stored by the digital computing system as indicated at step 76 and/or sent to appropriate output devices so as to output the CMYK color separations. The composite color reproduction of the image using the CMYK color separation prints is then prepared as indicated at step 78 by aligning and inking each of the individual color separations thus concluding the overall method as indicated at step 80.

Figure 4:
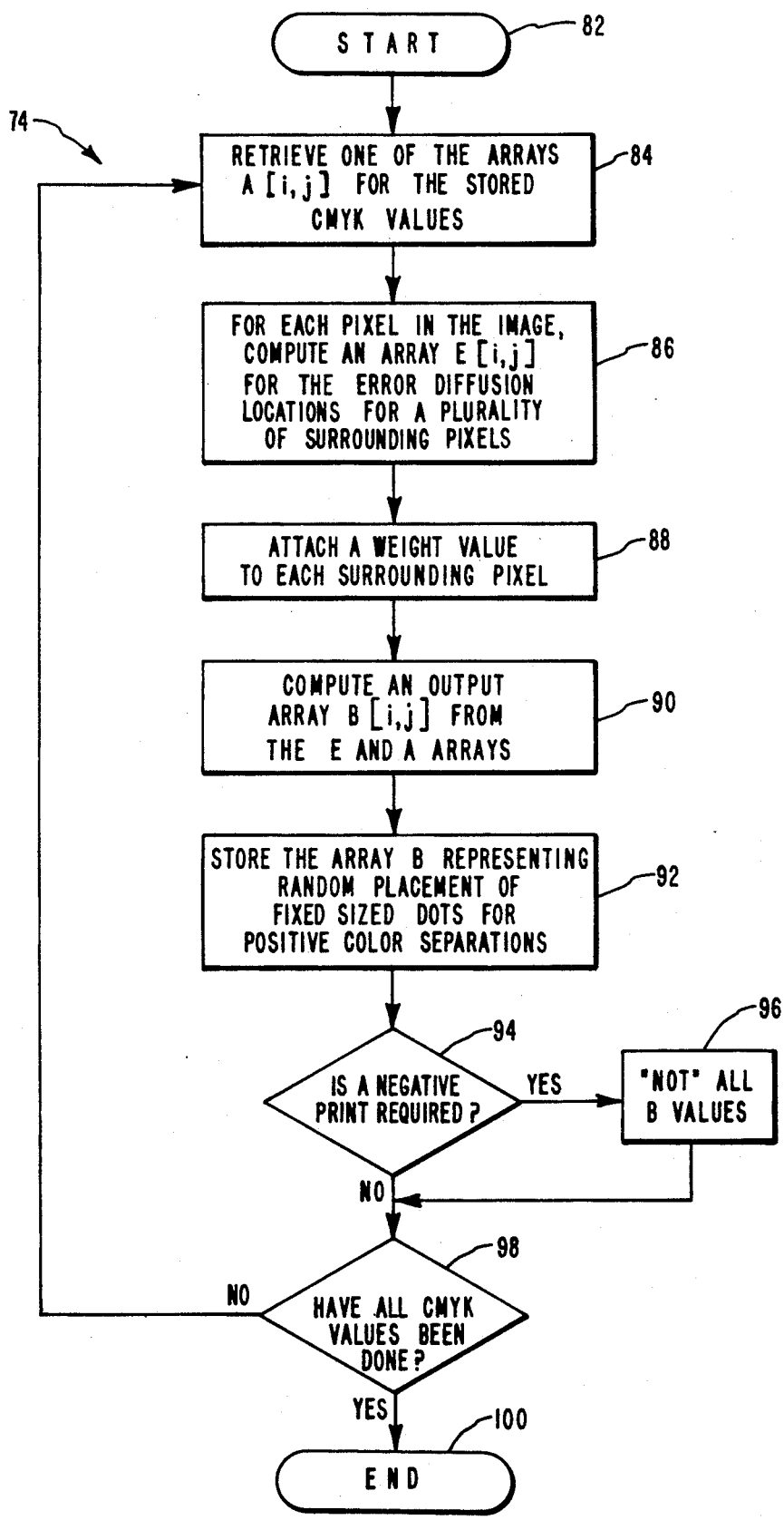
FIG. 4 is a flow chart illustrating in additional detail one presently preferred method for generating random placement, fix sized dots for use in color image production processes.

FIG. 4 illustrates in greater detail the various steps which are employed for the step generally designated at 74 in FIG. 3B for generating randomly placed fixed size dot separations for the CMYK color separation prints.

As illustrated in the flow chart of FIG. 4, the method begins at step 82 and is followed at step 84 by retrieval of one of the arrays A[i,j] for the stored CMYK color values. As previously described, the arrays A[i,j] for the CMYK values are derived by digitally processing each of the RGB arrays that are digitally input to the CPU 16. As shown at step 86, for each pixel in the image, the error E[i,j] is computed along with the error diffusion locations for a plurality of surrounding pixels. The error diffusion locations in the presently preferred embodiment are computed for the locations as described above in connection with Table 1. As represented in step 88, a weight value is then assigned to each of the surrounding pixels, which in the presently preferred embodiment is determined in accordance with Table 2 described above. As indicated at step 90 the CPU then computes an output array B[i,j] from the arrays E and A using, for example, computational steps as described in section A.3. above and then the output array B, which contains the information representing random placement of fixed size dots for positive color separations is electronically stored as indicated at step 92. At step 94 it is determined whether a negative print is required and if so all B values of the output array are processed with a "not" operation in the manner described above otherwise the method advances to step 98 where it is determined whether all of the CMYK values have been done. If so the method is terminated as indicated at step 100, otherwise the method returns to step 84 and repeats the process for the next CMYK array A[i,j].

Figure 5:
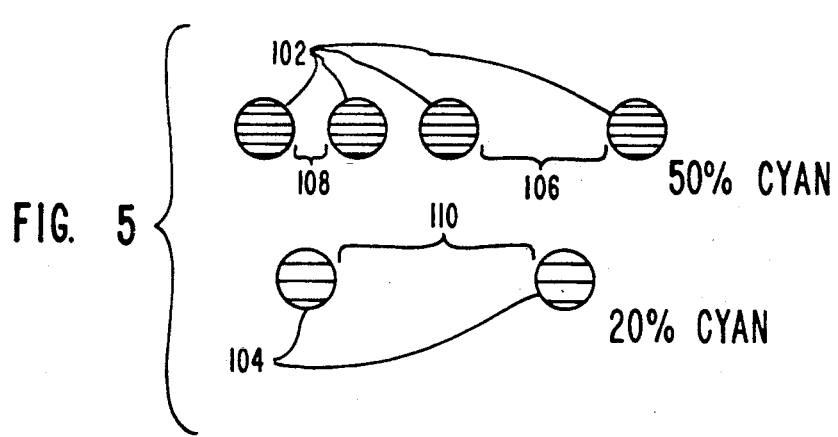
FIG. 5 is a schematic diagram generally illustrating an example of random placement of fixed size dots for a selected standard process color.

FIG. 5 schematically illustrates an example of random placement of fixed size dots. As shown in FIG. 5, each CMYK color separation print which is output will have a plurality of dots on each line of the print and rather than varying the size of the dots, each dot will have the same size. For parts of the print which require, for example, color density for cyan of fifty percent the fixed size dots would be randomly spaced such as illustrated by the dots 102 in the top line. Thus, one of the dots might be separated by a larger space 106 whereas the other remaining dots might be separated by a smaller space 108. Where a portion of the color separation for the cyan color would require, for example, a color density of twenty percent the dot size would not vary but the spacing between the dots would be greater. Thus, as shown for example in FIG. 5 on the second line, the dots 104 are the same size as the dots 102 but the spacing 110 between the dots 104 would be greater thereby decreasing the color density so as to approximate a twenty percent color density.

C. Examples

Attached hereto at Appendix B, and incorporated herein by reference, is an example of a computer program listing written in C which serves to illustrate one way in which the method of the present invention was implemented to control a conventional computer system. It should be recognized that the system and method of the present invention are not intended to be limited by the program listing contained in Appendix B, which is merely an illustrative example, and that the program could be implemented using languages other than C, or using other programs written and based upon the inventive concepts described herein.

Figure 6:
FIG. 6 is an original color image which was used in connection with the system and method of the present invention to produce a composite color image reproduction as shown by the enlarged reproduction of the original at FIG. 7.
Figure 7:

An example of results actually obtained using the program listing of Appendix B is illustrated in FIGS. 6 and 7. FIG. 6 illustrates an original color image taken with a 35 mm camera, and FIG. 7 illustrates the color image reproduction prepared from the original by running the program on a 386 IBM PC compatible computer. The original photograph at FIG. 6 was input to the computer using a Sharp Model JX-450 color scanner and the color image reproduction was printed using a Calcomp Colorview Model 5913 color printer. The original image was scanned in at 300 dpi and the output color image reproduction was printed at 300 dpi.

D. Conclusion

In summary, the present invention provides a system and method for color image reproduction utilizing a digital computing system to generate random placement of fixed size dots so as to substantially eliminate many or most of the misalignment difficulties otherwise inherent in preparing color image reproductions, while nonetheless preserving high quality resolution and faithful color reproduction. The system and method of the present invention do not limit the number of dots per inch which can be printed using digital computing systems, and requires less data to store the same amount of information. Further, the halftone dots used in producing the color image reproduction are all of the same size so as to substantially minimize or eliminate the necessity for reproducing relative sizes of variably sized halftone dots, thereby substantially reducing or eliminating the problem of halftone dot size growth. Fewer pixels for computation are required utilizing the system and method of the present invention, which increases the speed and throughput of the final color image reproduction, which also helps to eliminate other associated problems such as edge break-up.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

APPENDIX A

Interpolation: The following equations were used for interpolation in the x and y directions of the picture being expanded or shrunk:

For no expand or shrink in x:

Copy input data to output data.

For no expand or shrink in y:

Copy input data to output data.

For expand in x:

Introducing some variables:

x pix = number of pixels on input.

x size = number of pixels on output.

x num = accumulator, initially 0. Counts multiples of x pix until x size is reached. On accumulating x pix, if x size is not reached, output current pixel from input pixel. When x size is reached and x number = x size, output current pixel, advance to next input pixel, and subtract x size from x num. When x size is reached and x num ≥ x size, advance to next input pixel and subtract x size from x num.

x count = counts number of pixels output. Initially equal to x size and counts down to zero. When zero is reached, expansion is complete for this line of output.

Expand in x algorithm:

Extract two input pixels from input buffer. Separate both input pixels into Red, Green, and Blue components.

Find Red Interpolation value:

R00 = first input pixel red value

R10 = second input pixel red value

RI = new interpolated red value

RI := [(R10*x size)+(R00-R10)*(x size-x num)]/x size;

Find Green Interpolation value:

G00 = first input pixel green value

G10 = second input pixel green value

GI = new interpolated green value

GI := [(G10*x size)+(G00-G10)*(x size-x num)]/x size;

Find Blue Interpolation value;

B00 = first input pixel blue value

B10 = second input pixel blue value

BI = new interpolated blue value

BI := [(B10*x size)+(B00-B10)*(x size-x num)]/x size;

Convert interpolated colors into a color word suitable for output. Output the new interpolated color word and subtract one from x count. If x count = 0, then output is complete for this x line. If x count is not equal to zero, calculate ratio for next pixel:

x num := x num + x pix;

if x num ≤ x size do use the same two input pixels and interpolate again;

else do begin x num := x num - x size;

copy second input pixel to first input pixel and extract one more input pixel as the second pixel and interpolate again;

end.

Interpolate until x count becomes zero. Return the x num value in case the caller is expanding x in sections (or strips). Then advance to either the expand in y interpolation routine, shrink in y interpolation routine, or one of the no expand or shrink in y routines. Always interpolate x and then y.

Since two input pixels are used for calculating at least one output pixel for expansion in x, the input buffer must contain at least x pix + 1 pixels. The extra pixel can be a duplication of the actual last pixel in the input line.

Shrink in x algorithm:

x pix, x size, x num, x count, R00, G00, and B00 are the same as defined for expansion in x algorithm.

Introducing new variables for shrink in x:

RCA = Red Color Accumulator, initially 0.

GCA = Green Color Accumulator, initially 0.

BCA = Blue Color Accumulator, initially 0.

MF = Multiplication Factor

Initially set input buffer pointer to beginning of input buffer.

Extract one input pixel from the input buffer. Separate the input pixel into its Red, Green, and Blue components (R00, G00, and B00).

Calculate ratio for this pixel:

MF := x size;

if x num ≤ x pix do begin x num := x num + x size;

if x num ≤ x pix do advance input pointer to next input pixel but don't extract and separate a new input pixel yet;

else do

MF := x pix + x size - x num:

end;

else do begin advance input pointer to next pixel but don't extract and separate a new input pixel yet; x num := x num - x pix; MF := x num;

end;

Calculate new accumulator values:

RCA := RCA + (MF * R00);

GCA := GCA + (MF * G00);

BCA := BCA + (MF * B00);

Check to see if this is the last input pixel for the output pixel:

if x num ≤ x pix do

Go back and extract next input pixel according to input pointer and separate into Red, Green, and Blue components (R00, G00, and B00);

else if x num = x pix do x num := 0;

Last input pixel for output pixel, calculate final output pixel and convert the interpolated colors into a color word suitable for output:

R00 := RCA / x pix;

G00 := GCA / x pix:

B00 := BCA / x pix:

Convert to suitable color word;

Output pixel;

Check to see if more x output is required:

x count := x count - 1:

if x count = 0 do return x num to caller in case caller is shrinking x in sections (or strips):

```
            else do
        begin
                RCA := 0;
                GCA := 0;
                BCA := 0;
                Loop back and extract the next input pixel
                according to input buffer pointer and separate
                into Red, Green, and Blue components (R00, G00,
                and B00);
        end;
```

When shrinking in x, the input buffer does not require x pix + 1 input pixels. x pix input pixels is all that is used.

Expand in y algorithm:

Expansion in y is the same algorithm as expansion in x except that the input pixels come from two already interpolated x lines.

| | |
|---|---|
| R00 = | first input pixel from first interpolated x input line |
| R01 = | first input pixel from second interpolated x input line |
| G00 = | first input pixel from first interpolated x input line |
| G01 = | first input pixel from second interpolated x input line |
| B00 = | first input pixel from first interpolated x input line |
| B01 = | first input pixel from second interpolated x input line |
| y pix = | number of y lines on input | y size = number of y lines of output y num = accumulator, initially 0. Same definition as x num.

y count = counts number of lines output. Initially equal to y size and counts down to zero. When zero is reached, interpolation is complete for the entire image.

RI = [(R01*y size)+(R00-R01)*(y size-y num)]/y size;

GI = [(G01*y size)+(G00-G01)*(y size-y num)]/y size;

BI = [(B01*y size)+(B00-B01)*(y size-y num)]/y size;

Output y num in case the caller is expanding y in sections (or strips).

As with expansion in x, y pix + 1 interpolated input lines are required to output y size lines when expanding in the y direction. The extra line can be duplication of the actual last line of input.

Shrink in y algorithm:

Shrinking in y is the same algorithm as shrinking in x except that the input pixels came from one already interpolated x line.

y pix, y size, y num, y count, and MF are the same as defined previously.

RCAm = Red Color Accumulators for input pixel m, initially 0.

GCMA = Green Color Accumulators for input pixel m, initially 0.

BCMa = Blue Color Accumulators for input pixel m, initially 0.

Output y num in case caller is shrinking y in sections (for strips).

As with shrinking in x, only y pix input lines are required for shrinking in y.

APPENDIX B

```
/***************************************************************/
/* Copyright © 1990                                            */
/* ONYX Graphics Corporation                                   */
/* separate(color,res) is a procedure which will separate a   */
/* single color layer using the fixed sized dot, random       */
/* placement method.  This procedure has the ability to        */
/* sectionalize a picture into horizontal and vertical        */
/* strips dependent upon the maximum width and height of a    */
/* particular printer.                                         */
/* Internal variables:                                         */
/*     color = 0 for yellow                                    */
/*             1 for magenta                                   */
/*             2 for cyan                                      */
/*     res = resolution of the output printer                  */
/*     column_width = pointer to integer array containing     */
/*                   width in output pixel res / inch for     */
/*                   each horizontal strip                     */
/*     row_height = pointer to integer array containing        */
/*                  height in output pixel res / inch for     */
/*                  each vertical strip                        */
/*     column_files = file descriptor array for each output   */
/*                    file of a particular column              */
/*     width = total width in output pixel res / inch          */
/*     height = total height in output pixel res / inch        */
/*     xadd = input number of pixels (added to xnum)           */
/*     xnum = numerator for expansion or shrink in x           */
/*            direction                                        */
/*     xden = output number of pixels (denominator for         */
```

```
/*              expansion or shrink in x direction)          */
/*      yadd = input number of pixels (added to ynum)        */
/*      ynum = numerator for expansion or shrink in y        */
/*             direction                                      */
/*      yden = output number of pixels (denominator for      */
/*             expansion or shrink in y direction)           */
/*      xseek = x seek location in source file               */
/*      yseek = y seek location in source file               */
/*      i, j, k, l, m, n, o = temporay variables             */
/*      ibuffer = pointer to input buffer                    */
/*      ebuffer = pointer to expand buffer                   */
/*      fdrp_buffer = pointer to fixed sized dot, random     */
/*                    placement buffer                        */
/*      bbuffer = pointer to byte buffer used to store byte  */
/*                flags for output                           */
/*      obuffer = pointer to output buffer                   */
/*      temp_ptr = temporary pointer variable                */
/*      tempc = temporary character pointer                  */
/*      image_start = string array containing start string   */
/*                    for starting graphics mode in a        */
/*                    particular output printer              */
/*      length = array containing final output length of each */
/*               horizontal strip (column)                   */
/*      filename = temporary string array used to build a    */
/*                 unique filename for each output column    */
/*                 file                                       */
/*      text = string array used to output the percentage of */
/*             separation performed so far                   */
/*      cpercent = percentage of separation performed so far */
/*                                                            */
/* External variables:   scrop.width = percentage width of   */
/*                                     sized and cropped     */
/*                                     image for each column */
/*                       scrop.height = percentage height of */
```

```
/*                                      sized and cropped    */
/*                                      image for each row   */
/*                          scrop.columns = number of columns */
/*                          scrop.rows = number of rows       */
/*                                                            */
/* External functions: init_fdrp_buffer() = allocates and    */
/*                                       initializes the     */
/*                                       fdrp buffer         */
/*                          color_correct() = color correction */
/*                                       for current pixel   */
/**************************************************************/
separate(color,res)
int color;
double res;
{
        unsigned int *column_files;
        int *fdrp_buffer[3], *temp_ptr;
        long width, height, *column_width, *row_height, xseek, yseek;
        long xnum, xden, xadd, ynum, yden, yadd;
        long i, j, k, l, m, n, o;
        unsigned char *ibuffer, *bbuffer, *ebuffer, *obuffer;
        unsigned char tempc, image_start[5], length[2], filename[16];
        unsigned char text[16];
        double cpercent;
/**************************************************************/
/* Allocate memory for number of files to open for columns */
/**************************************************************/
column_files = (unsigned int *)malloc(scrop.columns*
                                        sizeof(unsigned int));
/****************************************/
/* Allocate and calculate column widths */
/****************************************/
column_width = (long *)malloc(scrop.columns*sizeof(long));
width = 01;
```

```c
if (scrop.columns > 1)
    for (i=01;i<(long)(scrop.columns-1);i++)
    {
        column_width[i] = (long)(columns[i] * scrop.width * res +
                                                                0.5);
        if (i)
            for (j=0;j<i;j++)
                column_width[i] -= column_width[j];
        width += column_width[i];
    }
column_width[scrop.columns-1] = (long)(scrop.width * res + 0.5) -
                                                                width;
width += column_width[scrop.columns-1];
xden = width;
/****************************************/
/* Allocate and calculate row heights */
/****************************************/
row_height = (long *)malloc(scrop.rows*sizeof(long));
height = 01;
if (scrop.rows > 1)
for (i=01;i<(long)(scrop.rows-1);i++)
{
    row_height[i] = (long)(rows[i] * scrop.height * res + 0.5);
    if (i)
    for (j=0;j<i;j++)
        row_height[i] -= row_height[j];
    height += row_height[i];
}
row_height[scrop.rows-1] = (long)(scrop.height * res + 0.5) -
                                                                height;
height += row_height[scrop.rows-1];
yden = height;
```

```c
/****************************************************************/
/* Allocate enough memory for expand buffer, byte buffer, and   */
/* output buffer                                                */
/****************************************************************/
ebuffer = (unsigned char *)malloc((unsigned int)width + 2);
bbuffer = (unsigned char *)malloc((unsigned int)width);
i = (long)(max_width * res / 8.0);
if (fmod(max_width*res,8.0))
    i++;
obuffer = (unsigned char *)malloc((unsigned int)i);
/***********************************************************/
/* Calculate input pixel length for x and y directions *    */
/***********************************************************/
xadd = (long)((double)(scrop.crop.x2 - scrop.crop.x1 + 1) *
                                        (double)display.xden /
                                        (double)(bound.x2 -
                                        bound.x1 + 1) + 0.5);
yadd = (long)((double)(scrop.crop.y2 - scrop.crop.y1 + 1) *
                                        (double)display.yden /
                                        (double)(bound.y2 -
                                        bound.y1 + 1) + 0.5);
/********************************************/
/* Allocate enough memory for input buffer */
/********************************************/
ibuffer = (char *)malloc((unsigned int)(xadd*31));
width += 51;
/****************************************************************/
/* Allocate fdrp_buffer memory and initialize memory to zero */
/****************************************************************/
init_fdrp_buffer(width,fdrp_buffer);
/************************************************/
/* Find initial seek locations into source file */
/************************************************/
xseek = (long)((double)(scrop.crop.x1 - bound.x1) *
```

```
                                            (double)display.xden /
                                            (double)(bound.x2 -
                                       bound.x1 + 1) + 0.5) * 3l;
    yseek = (long)((double)(scrop.crop.y1 - bound.y1) *
                                            (double)display.yden /
                                            (double)(bound.y2 -
                                       bound.y1 + 1) + 0.5);
    ynum = 0l;
    /***************************/
    /* Loop for number of rows */
    /***************************/
    for (i=1l;i<=(long)scrop.rows;i++)
    {
            /****************************/
            /* Open unique column files */
            /****************************/
            for (j=0l;j<(long)scrop.columns;j++)
            {
                    sprintf(filename,"%s%03ld.%03ld",
                                            sep_file[color],j+1,i);
                    column_files[j] = open(filename,O_BINARY | O_CREAT |
                                            O_TRUNC | O_WRONLY,
                                            S_IREAD | S_IWRITE);
            }
/******************************************************************/
/* Display 0% separation performed to start and display row number */
/******************************************************************/
            _settextposition(2,1);
            sprintf(text,"row %3ld",i);
            _outtext(text);
            _settextposition(3,1);
            _outtext("  0.0%");
/******************************************************************/
/* If first row, perform expansion or shrink and fixed sized dot, */
```

```c
/* random placement calculation twice for initializing the      */
/* fdrp_buffer                                                   */
/****************************************************************/
          if (i == 11)
          {
                    /******************************************/
                    /* Input source pixels from source file */
                    /******************************************/
                    lseek(env.file_handle,yseek * (long)display.xden * 31
                                                  + xseek + 111,SEEK_SET);
                    read(env.file_handle,ibuffer, (unsigned int) (xadd*31));
                    /**********************************/
                    /* Color correct for first pixel */
                    /**********************************/
                    tempc = color_correct(ibuffer[0]);
                    for (k=xnum=01,j=21;j<(xden+21);j++)
                    {
                              /******************************/
                              /* Expand or shrink input data */
                              /******************************/
                              if (xnum >= xden)
                              {
                                        while (xnum >= xden)
                                        {
                                                  k += 31;
                                                  xnum -= xden;
                                        }
                                        /**********************************/
                                        /* Color correct for current pixel */
                                        /**********************************/
                                        tempc = color_correct(ibuffer[k]);
                              }
                              /************************************************/
                              /* Copy temporary variable to expand buffer */
                              /************************************************/
```

```
                ebuffer[j] = tempc;
                xnum += xadd;
        }
/****************************************************************/
/* Copy 1st pixel into the two leftmost positions of expand buffer */
/* for fdrp calculation                                          */
/****************************************************************/
                ebuffer[0] = ebuffer[1] = ebuffer[2];
/****************************************************************/
/* Perform fixed dot, random placement calculation on first two */
/* duplicated rows for initialization                           */
/****************************************************************/ for (k=01;k<2;k++)
                {
                        if ((fdrp_buffer[2][2] = ebuffer[0] +
                                (((fdrp_buffer[0][2] << 1) +
                                (fdrp_buffer[1][1] << 1) +
                                fdrp_buffer[1][1] +
                                (fdrp_buffer[1][2] << 1) +
                                fdrp_buffer[1][2] +
                                (fdrp_buffer[1][3] << 1) +
                                fdrp_buffer[1][3] +
                                (fdrp_buffer[2][0] << 1) +
                                (fdrp_buffer[2][1] << 1) +
                                fdrp_buffer[2][1]) >> 4)) > 127)
                                        fdrp_buffer[2][2] -= 255;
                        if ((fdrp_buffer[2][3] = ebuffer[1] +
                                (((fdrp_buffer[0][3] << 1) +
                                (fdrp_buffer[1][2] << 1) +
                                fdrp_buffer[1][2] +
                                (fdrp_buffer[1][3] << 1) +
                                fdrp_buffer[1][3] +
                                (fdrp_buffer[1][4] << 1) +
```

```
                    fdrp_buffer[1][4] +
                    (fdrp_buffer[2][1] << 1) +
                    (fdrp_buffer[2][2] << 1) +
                    fdrp_buffer[2][2]) >> 4)) > 127)
                        fdrp_buffer[2][3] -= 255;
            for (l=41;l<(xden+41);l++)
            {
                if ((fdrp_buffer[2][l] = ebuffer[l-2] +
                    (((fdrp_buffer[0][l] << 1) +
                    (fdrp_buffer[1][l-1] << 1) +
                    fdrp_buffer[1][l-1] +
                    (fdrp_buffer[1][l] << 1) +
                    fdrp_buffer[1][l] +
                    (fdrp_buffer[1][l+1] << 1) +
                    fdrp_buffer[1][l+1] +
                    (fdrp_buffer[2][l-2] << 1) +
                    (fdrp_buffer[2][l-1] << 1) +
                    fdrp_buffer[2][l-1]) >> 4)) > 127)
                        fdrp_buffer[2][l] -= 255;
            }
            temp_ptr = fdrp_buffer[0];
            fdrp_buffer[0] = fdrp_buffer[1];
            fdrp_buffer[1] = fdrp_buffer[2];
            fdrp_buffer[2] = temp_ptr;

}
    }
/*********************************************************************/
/* For each row height in the first set of columns, perform expand   */
/* or shrink of input data, and fixed sized dot, random placement    */
/* calculations and output to column files                           */
/*********************************************************************/
            for (j=0l;j<row_height[i-1];j++)
            {
```

```
/****************************************************/
/* Expand or shrink input data in the y direction */
/****************************************************/
        if (ynum >= yden)
        {
                while (ynum >= yden)
                {
                        yseek++;
                        ynum -= yden;
                }
/******************************************************/
/* Seek into source file and read in more source data */
/******************************************************/
                lseek(env.file_handle,yseek *
                        (long)display.xden * 31 + xseek +
                        111,SEEK_SET);
                read(env.file_handle,ibuffer,(unsigned
                        int)(xadd*31));
/****************************************/
/* Color correct for the first pixel */
/****************************************/
                tempc = color_correct(ibuffer[0]);
                for (l=xnum=01,k=21;k<(xden+21);k++)
                {
/******************************************************/
/* Expand or shrink input data in the x direction */
/******************************************************/
                        if (xnum >= xden)
                        {
                                while (xnum >= xden)
                                {
                                        l += 31;
                                        xnum -= xden;
                                }
```

```
                /************************************/
                /* Color correct for current pixel */
                /************************************/
                        tempc = color_correct(ibuffer[1]);

}
                /***********************************************/
                /* Copy temporary variable to expand buffer */
                /***********************************************/
                        ebuffer[k] = tempc;

xnum += xadd;

}
        /*******************************************************************/
        /* Copy 1st pixel into the two leftmost positions of expand */
        /* buffer for fdrp calculation                              */
        /*******************************************************************/
                        ebuffer[0] = ebuffer[1] = ebuffer[2];
        /*****************************************************************/
        /* Calculate percentage of separation performed so far */
        /*************************************************************/
                        cpercent = (double)j / (double)(row_height[i-1]
                                                        - 1) * 100.0;
        /****************************************************************/
        /* Display percentage of separation performed so far */
        /****************************************************************/
                        _settextposition(3,1);

sprintf(text,"%5.11f\%",cpercent);

_outtext(text);

}
/**********************************************************************/
/* Perform fixed sized dot, random placement calculations for */
/* current input data and fill up byte buffer flags for       */
/* final output                                               */
```

```
/****************************************************************/
            if ((fdrp_buffer[2][2] = ebuffer[0] +
                    (((fdrp_buffer[0][2] << 1) +
                    (fdrp_buffer[1][1] << 1) + fdrp_buffer[1][1] +
                    (fdrp_buffer[1][2] << 1) + fdrp_buffer[1][2] +
                    (fdrp_buffer[1][3] << 1) + fdrp_buffer[1][3] +
                    (fdrp_buffer[2][0] << 1) +
                    (fdrp_buffer[2][1] << 1) + fdrp_buffer[2][1]) >>
                    4)) > 127)
                    fdrp_buffer[2][2] -= 255;
            if ((fdrp_buffer[2][3] = ebuffer[1] +
                    (((fdrp_buffer[0][3] << 1) +
                    (fdrp_buffer[1][2] << 1) + fdrp_buffer[1][2] +
                    (fdrp_buffer[1][3] << 1) + fdrp_buffer[1][3] +
                    (fdrp_buffer[1][4] << 1) + fdrp_buffer[1][4] +
                    (fdrp_buffer[2][1] << 1) +
                    (fdrp_buffer[2][2] << 1) + fdrp_buffer[2][2]) >>
                    4)) > 127)
                    fdrp_buffer[2][3] -= 255;
    for (k=4l;k<(xden+4l);k++)
    {
            if ((fdrp_buffer[2][k] = ebuffer[k-2] +
                    (((fdrp_buffer[0][k]<<1) +
                    (fdrp_buffer[1][k-1] << 1) +
                    fdrp_buffer[1][k-1] +
                    (fdrp_buffer[1][k] << 1)
                    fdrp_buffer[1][k] +
                    (fdrp_buffer[1][k+1] << 1) +
                    fdrp_buffer[1][k+1] +
                    (fdrp_buffer[2][k-2] << 1) +
                    (fdrp_buffer[2][k-1] << 1) +
                    fdrp_buffer[2][k-1]) >> 4)) > 127)
                    {
                            fdrp_buffer[2][k] -= 255;
                            bbuffer[k-4] = 1;
```

```
                }
                else
                        bbuffer[k-4] = 0;
        }
        temp_ptr = fdrp_buffer[0];
        fdrp_buffer[0] = fdrp_buffer[1];
        fdrp_buffer[1] = fdrp_buffer[2];
        fdrp_buffer[2] = temp_ptr;
        ynum += yadd;
/**************************************************************/
/* For each column file, output the current line of data */
/**************************************************************/
        for (k=1=01;k<(long)scrop.columns;k++)
        {
/**************************************************************/
/* Calculate number of 8 bit bytes for current column file  */
/**************************************************************/
                m = column_width[k] / 81;
                if (column_width[k] % 81)
                        m++;
/***********************************************/
/* Initialize output buffer to zero */
/***********************************************/
                for (n=01;n<m;n++)
                        obuffer[n] = 0;
/*********************************************************/
/* Loop through byte flags and build output buffer */
/* Note:    this loop may be changed to perform      */
/*          calculations for negative and transfer */
/*          image                                    */
/*********************************************************/
                for (n=o=01;n<m;l++)
                {
                        if (bbuffer[l])
```

```
                    obuffer[n] |= mask[o];
                 if (!(o = ((++o) % 8l)))
                    n++;
              }
/**************************************************/
/* Divide length of bytes into two unsigned characters for */
/* string output                                            */
/**************************************************/
              length[0] = (unsigned char)(m & 0xffl);

length[1] = (unsigned char)((m >> 8l) &
                                            0xffl);
/**************************************************/
/* Build initial output string to start printer graphics mode */
/**************************************************/
              sprintf(image_start,"\x01BK%c%c",
                              length[1],length[0]);
/**************************************************/
/* If this is the first row and this is the yellow separation, */
/* output a start of transmission character for this particular */
/**************************************************/
              if (!j && !color)
                   write(column_files[k],"\x002",1);
/************************************/
/* Output the graphics start string */
/************************************/
              write(column_files[k],image_start,4);
/************************************/
/* Output the data from the output buffer */
/************************************/
              write(column_files[k],obuffer,
                              (unsigned int)m);
         }
    }
```

```
/*****************************************************************/
/* Output final data for column files for a particular printer and */
/* close the output files                                        */
/*****************************************************************/
                for (j=01;j<(long)scrop.columns;j++)
                {
                        if (color < 2)
                                write(column_files[j],"\x00C",1);
                        else
                                write(column_files[j],"\x004",1);
                        close(column_files[j]);
                }
        }

/****************************************/
/* Free all allocated memory buffers.*/
/****************************************/
        free(ibuffer);
        free(ebuffer);
        free(bbuffer);
        free(obuffer);
        free(column_width);
        free(row_height);
        free(column_files);
        for (i=01;i<31;i++)
                free(fdrp_buffer[i]);
}
```

What is claimed and desired to be secured by United States Letters Patent is:

1. A method of color image reproduction comprising the steps of:
   electronically scanning an image containing a plurality of colors;
   electronically recording a digital RGB file containing information corresponding to density and placement of RGB colors contained in said image;
   inputting to a CPU said digital RGB file;
   digitally processing said RGB file with said CPU so as to map said information contained in said RGB file into corresponding CMYK color information contained in CMYK file;
   digitally processing with said CPU said entire CMYK file so as to initially drive therefrom color separation files each containing a representation of density and placement of one CMYK color, said representation comprising a random placement of fixed size dots; and
   preparing from said color separation files a composite color image.

2. A method of color image reproduction as defined in claim 1 wherein said image is defined by a plurality of pixels, and wherein said step of electronically recording said digital RGB file comprises the step of generating a digital array A[i,j] wherein A is a numerical value within a selected range and represents color density of a pixel, and i,j represent x-y coordinate position of a pixel.

3. A method of color image reproduction as defined in claim 1 further comprising the steps of:
  displaying said image containing a plurality of colors at a user terminal;
  inputting from said terminal to said CPU a new selected range for at least one of said RGB colors; and
  said CPU digitally processing said array A[i,j] so as to proportionately adjust all values A[i,j] corresponding to said at least one RGB color so that the adjusted values are within said new selected range.

4. A method of color image reproduction as defined in claim 1 wherein said step of digitally processing said digital RGB file comprises the step of generating an array A[i,j] for each CMYK color.

5. A method of color image reproduction as defined in claim 4 further comprising the steps of:
  displaying said image containing a plurality of colors at a user terminal;
  inputting from said terminal to said CPU a new selected range for at least one of said CMYK colors; and
  said CPU digitally processing the array A[i,j] corresponding to said at least one CMYK color so as to proportionately adjust all values thereof so that they are within said new selected range for the CMYK color.

6. A method of color image reproduction as defined in claim 3 wherein said step of digitally processing said digital RGB file comprises the step of generating a second array A[i,j] for each CMYK color.

7. A method of color image reproduction as defined in claim 6 further comprising the steps of:
  inputting from said terminal to said CPU a new selected range for at least one of said CMYK colors; and
  said CPU digitally processing the second array A[i,j] corresponding to said at least one CMYK color so as to proportionately adjust all values thereof so that they are within said new selected range for the CMYK color.

8. A method of color image reproduction as defined in claim 4 wherein said step of digitally processing with said CPU said CMYK file comprises the step of, for each said array A[i,j] generated for a CMYK color, generating an error diffusion array E[i,j] where E represents calculated error for each value A[i,j] at each pixel.

9. A method of color image reproduction as defined in claim 4 wherein said error diffusion array E[i,j] is computed for each pixel P[i,j] according to a pattern of surrounding pixels defined as follows:

|            |            | E[i,j−2]   |            |
|------------|------------|------------|------------|
|            | E[i−1,j−1] | E[i,j−1]   | E[i+1,j−1] |
| E[i−2,j]   | E[i−1,j]   | A[i,j]     |            | where E stands for the error computed for pixel P[x,y] from the value A[i,j] at pixel P(i,j), where $i-2 \leq x \leq i+1$ and $j-2 \leq y \leq j$.

10. A method of color image reproduction as defined in claim 9 wherein each said surrounding pixel is assigned a weight value as follows:

|   |   | 2      |   |
|---|---|--------|---|
|   | 3 | 3      | 3 |
| 2 | 3 | P[i,j] |   |

11. A method of color image reproduction as defined in claim 10 wherein said step of digitally processing with said CPU said CMYK file so as to derive therefrom color separation files comprises the steps of:

```
for i := 1 to n do
begin
    for j := 3 to m+2 do
    begin
        E[3,j] := A[3,j] +
            [(E[1,j] * W1) + (E[2,j−1) * W2) +
            (E[2,j] * W3) + (E[2,j−1) * W4) +
            (E[3,j−2] * W5) + (E[3,j−1] * W6)]/
            (W1 + W2 + W3 + W4 + W5 + W6);
        if E[3,j] < (Q+R)/2 then B[i,j−2] := 0 else begin
            B[i,j−2] := 1;
            E[3,j] := E[3,j] + (Q−R);
        end;
    end;
    for k := 1 to m+3 do
    begin
        E[1,k] := E[2,k];
        E[2,k] := E[3,k];
    end;
end.
``` wherein m,n represent the number of x-y coordinate positions for all pixels of said image, and where W1, W2, W3, W4, W5 and W6 are said weight values assigned to said surrounding pixels.

12. A method of color image reproduction as defined in claim 11 wherein each said color separation print is a negative print and wherein said step of digitally processing with said CPU said CMYK file further comprises the steps of:

```
for i := 1 to m do
    for j := 1 to n do
        B[i,j] := 1 − B[i,j].
```

13. A method of color image reproduction comprising the steps of:
  electronically scanning an image containing a plurality of colors, said image being defined by a plurality of pixels;
  electronically recording a first array of digital values representing density and placement of RGB colors contained in each pixel of said image;
  inputting to a CPU said first array of digital values;
  digitally processing with said CPU said first array of digital values so as to derive therefrom a separate array of digital values representing density and placement of each CMYK color contained in each pixel of said image;
  initially digitally processing with said CPU each said separate array for each CMYK color so that for each pixel of each CMYK color a separate error diffusion array is generated for a plurality of surrounding pixels for an entire color separation;
  digitally processing with said CPU each error diffusion array so as to assign a weight value to each said plurality of surrounding pixels, each said weight value being dependent upon the relative position of said surrounding pixels to the pixel for which the error diffusion array was determined;
  said CPU deriving from said weight values and said error diffusion arrays an output array for each CMYK color wherein each said output array defines a random placement of fixed size dots for the entire color separation of one of the CMYK colors; and
  preparing from said output arrays for each CMYK color a composite color image.

* * * * *

UNITED STATES PATENT AND TRADEMARK OFFICE
CERTIFICATE OF CORRECTION

PATENT NO. : 5,175,804

DATED : December 29, 1992

INVENTOR(S) : DEAN KARL WITTMANN

It is certified that error appears in the above-identified patent and that said Letters Patent is hereby corrected as shown below:

```
Column 1, line 32, "can not" should be --cannot--
Column 3, line 9, after "of" insert --differing--
Column 8, line 39, "(6surrounding" should be --(6 surrounding)--
Column 9, line 11, after "subject" insert --to the following
constraints.  The first constraint is that closer pixels to the current
pixel (P) should have a weight--
Column 9, line 18, after "and" insert --5--
Column 15, line 48, after "required" insert --.--
Column 18, line 24, "Without" should be --without--
```

Signed and Sealed this

Twenty-eighth Day of December, 1993

Attest:

BRUCE LEHMAN

*Attesting Officer*

*Commissioner of Patents and Trademarks*